US008096555B1

(12) United States Patent
Odom et al.

(10) Patent No.: US 8,096,555 B1
(45) **Date of Patent: *Jan. 17, 2012**

(54) METHOD OF CONDUCTING A WAGERING GAME WITH CONTINUOUS DEPLETION

(75) Inventors: Wayne Odom, Tucson, AZ (US); O. Karolyn Gee, Tucson, AZ (US)

(73) Assignee: Karaway Gaming, Tucson, AZ (US)

( * ) Notice: Subject to any disclaimer, the term of this patent is extended or adjusted under 35 U.S.C. 154(b) by 1472 days.

This patent is subject to a terminal disclaimer.

(21) Appl. No.: 11/518,653

(22) Filed: Sep. 11, 2006

Related U.S. Application Data

(63) Continuation-in-part of application No. 11/007,108, filed on Dec. 7, 2004, now Pat. No. 7,431,648, which is a continuation-in-part of application No. 09/977,138, filed on Oct. 12, 2001, now Pat. No. 7,056,205, and a continuation-in-part of application No. 09/942,520, filed on Aug. 29, 2001, now Pat. No. 7,425,178.

(60) Provisional application No. 60/241,644, filed on Oct. 19, 2000, provisional application No. 60/229,665, filed on Aug. 31, 2000.

(51) Int. Cl.
*A63F 1/00* (2006.01)
*A63F 13/10* (2006.01)

(52) U.S. Cl. ........................................ 273/292; 463/12

(58) Field of Classification Search .............. 463/11-13, 463/16; 273/292
See application file for complete search history.

(56) References Cited

U.S. PATENT DOCUMENTS

| | | | | | |
|---|---|---|---|---|---|
| 1,996,151 | A | * | 4/1935 | Gordon | 434/129 |
| 5,042,809 | A | * | 8/1991 | Richardson | 463/18 |
| 5,324,035 | A | * | 6/1994 | Morris et al. | 463/42 |
| 5,630,753 | A | * | 5/1997 | Fuchs | 463/9 |
| 5,967,894 | A | * | 10/1999 | Kinoshita et al. | 463/13 |
| 6,039,650 | A | * | 3/2000 | Hill | 463/47 |
| 6,113,102 | A | * | 9/2000 | Marks et al. | 273/292 |
| 6,126,541 | A | * | 10/2000 | Fuchs | 463/13 |
| 2002/0027323 | A1 | * | 3/2002 | Vancura et al. | 273/292 |
| 2002/0155872 | A1 | * | 10/2002 | Odom et al. | 463/13 |
| 2003/0083119 | A1 | * | 5/2003 | Hogan et al. | 463/13 |
| 2005/0073102 | A1 | * | 4/2005 | Yoseloff et al. | 273/292 |
| 2007/0052170 | A1 | * | 3/2007 | Taylor | 273/274 |

OTHER PUBLICATIONS

"Scarne's Encyclopedia of Card Games," by John Scarne, 1973, HarperCollins, chapter on blackjack.*
"Scarne's Complete Guide to Gambling," by John Scarne, 1961, Simon & Schuster, chapters on blackjack and blackjack strategy.*
"Chinese Card Games," published by Books LLC, Memphis, Tenn., 2010, chapter on Chinese blackjack.*

* cited by examiner

*Primary Examiner* — David L Lewis
*Assistant Examiner* — Matthew D. Hoel
(74) *Attorney, Agent, or Firm* — Robert Ryan Morishita; Morishita Law Firm, LLC

(57) ABSTRACT

A wagering game, such as Ban-Nag or Blackjack, includes defining a finite set of cards. The player plays multiple sequential game hands by placing a wager, receiving cards from the finite set cumulatively excluding any cards previously dealt, playing the game hand to completion, collecting the cards from the player and dealer and excluding the dealt cards from further play, and displaying at least the excluded cards or any winning combinations precluded by the excluded cards. Optionally, a proposition wager may be offered in each player game hand having an eligible game hand sum in which the player is rewarded if the player game hand reaches a target value. The game hands continue in sequence until a restoration event, which may be manually triggered or automatic, that restores the excluded cards. Optionally, multiple game hands may be dealt simultaneously from a finite set continuously depleted of dealt cards.

35 Claims, 2 Drawing Sheets

METHOD OF CONDUCTING A WAGERING GAME WITH CONTINUOUS DEPLETION

RELATED APPLICATION DATA

The present application is a continuation-in-part of U.S. patent application Ser. No. 11/007,108 entitled "Method of Conducting a Wagering Game with Continuous Depletion," filed Dec. 7, 2004 now U.S. Pat. No. 7,431,648, which, in turn, was a continuation-in-part of U.S. patent application Ser. No. 09/977,138 entitled "Electronic Card Game and Method," filed Oct. 12, 2001 now U.S. Pat. No. 7,056,205, which, in turn, claimed the priority of U.S. Provisional Application Ser. No. 60/241,644 entitled "Electronic Video Poker Game and Method," filed Oct. 19, 2000, and a continuation-in-part of U.S. patent application Ser. No. 09/942,520 entitled "Live And Electronic Wagering And Lottery Game," filed Aug. 29, 2001 U.S. Pat. No. 7,425,178, which, in turn, claimed the priority of U.S. Provisional Application Ser. No. 60/229,665 entitled "Live and Electronic Wagering and Lottery Game," filed Aug. 31, 2000.

FIELD OF THE INVENTION

The present invention relates to games. More specifically, the present invention is a method for conducting multiple hands of a wagering game, such as Ban-Nag or Blackjack, from a single finite game indicia set, such as a deck of cards; that cumulatively excludes game indicia, e.g. cards, previously dealt until a restoration event occurs.

BACKGROUND OF THE INVENTION

There are many known casino games using cards or other set of indicia to determine the outcome of the game. For example, many casino games of chance utilize reels displaying a fixed set of award symbols. These reel games are commonly referred to as reel slot machines or slot machines.

Slot machines can contain any number of reels, although most slot machines contain three, four, or five reels, and any number of pay lines, although most slot machines include one, three, five, eight, or nine pay lines. For example, in some slot machine games, each reel on a slot machine may index at a plurality of positions or stops, each of which contains a symbol or a blank. The number and location of index positions can vary depending upon the model type of each game but, in all instances, are fixed. These model types are determined by a variety of award tables and corresponding combinations of reel symbols. As noted above, the combination of symbols displayed when the reels index determines whether the player has won or lost. There are also video slot machines where a controlling processor simulates the action of a stepper game.

The player places a wager to initiate play of a slot machine. The player can place multiple wagers to, as described previously, increase the payout amounts, increase the number of active pay lines, or both. Often, the specific wagering structure dictates the allocation of multiple coin wagers. The reels are randomized, i.e. mechanically or electronically "spun," and the combinations of reel symbols index across the pay line or pay lines are examined for winning combinations. Winning combinations are rewarded according to a pay table which may take into account the size of the wager. The paytable is a schedule of all possible winning outcomes and the award for obtaining each.

Video draw poker is well known. In the conventional game of video draw poker known in the art, a gaming device is provided wherein the player makes a wager and the device's processor selects from a data structure containing data representing cards in a deck of playing cards, five cards to be displayed face up to represent an initial hand. The player selects which, if any, of the five cards of the initial hand to hold and prompts the processor to discard the remaining cards. The discarded cards are replaced with replacements selected from the data structure to produce a final hand outcome of a five card poker hand. The video draw poker device compares the final outcome to the pre-determined winning combinations also stored in a data structure defining the pay table, these combinations frequently representing ranked poker hands. If the player's final outcome matches a winning combination, the player is rewarded. Otherwise, the final outcome is deemed to be a loss and the player's wager is retained.

In a variation of video draw poker, multiple hands may be provided. As with conventional video draw poker, the device's processor randomly deals five cards to a player for an initial hand. The player selects which, if any, of the five cards of the initial hand to hold. Prior to drawing replacement cards for the initial hand, the held cards are copied into the other hands. The player prompts the processor to discard the remaining cards and additional cards are drawn to replace the discarded cards. The processor then repeats the draw step for the additional hands. Thus, a player receives multiple opportunities to draw to the same held cards.

Blackjack is a well known card game played in casinos. The object of the game is to have a final hand total closer to twenty-one than the dealer's hand without exceeding twenty-one. For purposes of calculating the final hand total, each card has a value equal to its face value except face cards, which have a value of ten, and aces, which may have a value of eleven or one as the player selects or as required to prevent the player from exceeding twenty-one. In conventional Blackjack, the suit of the cards is not relevant to the outcome of the game.

The form of Blackjack played in casinos is played between a dealer, representing the house, and at least one player. In a typical Blackjack game, each player makes a wager in a wagering area on a playing surface. The dealer deals two cards to each player and two cards, one card face up and the other face down, to himself or herself. Any player receiving a natural twenty-one or Blackjack, i.e. a total of twenty-one in the initial dealt hand, is immediately rewarded, typically at a rate of 2:1, 3:2, or 6:5, and play is terminated as to that player. Each remaining player examines his or her hand and decides whether to hit, i.e. receive another card, or stand, i.e. receive no further cards and finish play with the player's current hand. A player may hit as many times as the player wishes as long as the player does not bust, i.e. have a cumulative total greater than twenty-one. When a player busts, that player's wager is immediately collected and play is terminated as to that player.

A player may also have additional options available depending on the initial hand dealt and the house rules. For example, a player may have the option of "doubling down." Although the availability of the double down option varies depending on each casino's house rules, the option allows a player to double the player's wager in exchange for a single additional card. Some house rules permit doubling down on initial hand totals of ten or eleven only, other house rules permit doubling down on any initial hand total.

Another option available to a player is the option of "splitting." If a player receives a pair, i.e. two cards having the same face value, in his initial hand, most house rules permit the player to split the pair and use each card as a basis for a separate hand. For example, if a player is dealt a pair of eights, the player may choose to split the pair and continue play with two hands each having an eight and an additional dealt card as an initial hand. Each of those individual hands is then played independently by hitting, standing, or, under some house rules, doubling down or further splitting.

After all the players have played their hands, the dealer reveals the face-down card in the dealer's hand and completes the dealer's hand according to established house rules. That is, the casino uses established rules to eliminate the dealer's discretion. The dealer hits or stands as the house rules dictate, and resolves the wagers. In resolving the wagers, players with a final hand total closer to twenty-one than the dealer's final hand total are rewarded at even money. Conversely, wagers are collected from players with a final hand total further from twenty-one than the dealer's final hand total. If the dealer busts, all players who did not bust or receive a Blackjack are rewarded at even money. If the player and dealer push, i.e. have the same final hand total, the player's wager is returned.

Ban-Nag, also known as Chinese Blackjack is another card game played in casinos. The object of the game is to have a final hand total closer to twenty-one than the dealer's hand without exceeding twenty-one. For purposes of calculating the final hand total, each card has a value equal to its face value except face cards, which have a value of ten, and aces, which may have a value of one, ten, or eleven as determined primarily by the number of cards in the hand, and secondarily by the other cards in the hand. In Ban-Nag, the suit of the cards is not relevant to the outcome of the game. The value of the ace is typically determined as follows, with the value selected so as to obtain the highest hand total without exceeding twenty-one:

| Number of cards in the hand | Value of an Ace |
|---|---|
| 2 | 10 or 11 |
| 3 | 1 or 10 |
| 4 | 1 |

The form of Ban-Nag played in casinos is played between a dealer, representing the house, and at least one player, and uses a deck comprised of between one and eight standard decks of cards. In a typical Ban-Nag game, each player makes a wager in a wagering area on a playing surface. The dealer deals an initial player hand of two cards to each player and an initial dealer hand of two cards face down to himself or herself. Any player receiving a Blackjack, consisting of either two aces, or an ace and a ten-value card is immediately rewarded, typically according to the following pay table, unless the dealer has an equal or higher ranking Blackjack hand, and play is terminated as to that player.

| Player Hand | Dealer Hand | Result |
|---|---|---|
| Two Aces (Ban-Ban) | Two Aces (Ban-Ban) | Push |
| | Total of Fifteen | Optional Escape |
| | All Others | Player Paid 3:1 |
| Ace/Ten-Value (Ban-Nag) | Two Aces (Ban-Ban) | Player Loses 3:1 |
| | Ace/Ten-Value (Ban-Nag) | Push |
| | Total of Fifteen | Optional Escape |
| | All Others | Player Paid 2:1 |

If the player has a hand totaling less than twenty-one, the player completes the final player hand as follows, continuing until the player elects to stand:

| Player hand total | Player options |
|---|---|
| 15 or less on four cards or less | Hit |
| 16 to 20 on four cards or less | Hit or stand |
| More than 21 | Bust, player loses |
| 21 on 3 or four cards | Stand, Player wins 2:1 |
| 21 on five cards | Stand, Player wins 3:1 |
| 6 to 20 on five cards | Stand, Player wins 2:1 |

At any point in the play of a hand, if a player achieves a hand totaling fifteen, the player has the option to escape, and push his wager, regardless of the dealer hand. Alternatively, the player has the option to continue play, foregoing the escape option.

Once the player has completed the final player hand, or busted, the dealer examines the initial dealer hand. If the dealer receives a Blackjack, consisting of either two aces, or an ace and a ten-value card, the dealer is rewarded according to the following paytable, and the hand is terminated for all players.

| Dealer Hand | Player Hand | Result |
|---|---|---|
| Two Aces (Ban-Ban) | Two Aces (Ban-Ban) | Push |
| | Total of Fifteen | Escape |
| | All Others | Players Lose 3:1 |
| Ace/Ten-Value (Ban-Nag) | Two Aces (Ban-Ban) | Player paid 3:1 |
| | Ace/Ten-Value (Ban-Nag) | Push |
| | Total of Fifteen | Escape |
| | All Others | Players Pay 2:1 |

If the dealer receives a hand totaling fifteen, the dealer has the option to escape, declaring a non-hand, pushing all wagers. Alternatively, the dealer has the option to continue playing the hand, foregoing the escape option. Typically, the dealer escape election is determined by deck factors and the number of player Blackjacks and busts. If the dealer has a hand totaling less than twenty-one, the dealer completes the final dealer hand according to the rules used in completing the final player hand. Optionally, house ways rules may be defined to remove the dealer options on hands totaling between 16 and 20.

If the dealer busts, all remaining final player hands are paid at 1:1. If the dealer stands, the remaining final player hands are compared to the final dealer hand. If the total of the dealer final hand is higher than that of a player final hand, the player loses their wager. If the total of a player final hand is higher than that of the dealer final hand, the player wins and is paid at 1:1. If the total of a player final hand equals that of the dealer final hand, that player pushes, i.e. neither wins nor loses. Optionally, as the potential for a player losing more than their wager exists (where the dealer has a Ban-Ban, a Ban-Nag, or a hand of 5 cards), the player may be required to maintain an escrow of up to two times their wager.

SUMMARY OF THE INVENTION

The present invention is a method for conducting a wagering game. The present method can be applied to any base game using a set of game indicia. The base game includes, but is not limited to, games in which a player plays the game indicia originally dealt, such as slot machines, lotto, Bingo, stud, poker, Ban-Nag, or the like; games in which players obtain additional cards or game indicia during the game (either at the player's option or automatically), such as Blackjack, Ban-Nag, or twenty-one, and poker; and games in which a player may opt to discard and replace game indicia, such as draw poker. The present method may also be applied to single player or multi-player games.

A finite set of cards or other game indicia are defined. Optionally, the finite set of game indicia are ordered. The present method can be thought of as a multi-hand game. In one optional embodiment, the game hands are dealt sequentially; in an alternate embodiment, the game hands are dealt simultaneously. In either case, the player places a wager for a game hand and game indicia are dealt to the player from the finite set cumulatively excluding all game indicia dealt in previous game hands, if any. The player plays the game hand to completion according to the base game. A determination is made whether the game hand forms a winning hand according to the base game. In one optional embodiment, this determination may be made by comparing the game hand to a schedule of game hands. In another optional embodiment, this determination may be made by comparing the game hand to one or more other player's and/or dealer's game hands.

In an optional embodiment, a proposition wager may be offered during the course of a hand. In one such optional embodiment, a player having an eligible player game hand sum may place a proposition wager that the player will obtain a target sum. Optionally, the proposition wager may be placed anytime after the original deal and may be placed more than once if the player game hand sum remains an eligible player hand sum. If the player obtains the target sum, the player is rewarded on his proposition wager. Optionally, the player may be rewarded at greater than even money if the player obtains the target sum within one additional playing card.

Game indicia dealt are collected and, along with all game indicia dealt in previous game hands, are excluded from play in a subsequent game hand. At least one of (1) the inventory of the game indicia from the finite set cumulatively excluding all game indicia dealt in previous game hands or (2) winning outcomes available (or those winning outcomes eliminated) as a result of exclusion of indicia from the depleted indicia set for the next hand is displayed to the player. Optionally, both may be displayed.

In an optional embodiment in which multiple game hands are dealt simultaneously, the process is repeated for each game hand. Optionally, the player may be allowed to select the order in which game hands are conducted.

In an optional embodiment in which multiple game hands are dealt sequentially, the process is repeated for additional sequential game hands. Specifically, the steps of placing a wager, dealing game indicia, completing a game hand, collecting and excluding dealt game indicia, and displaying the game indicia inventory and/or the winning hands eliminated by the exclusion of game indicia, are repeated until a restoration event.

The restoration event may include at least a manual restoration event, such as a player triggered restoration. In an optional multi-player embodiment, only one player may be eligible to trigger a manual restoration event on any game hand. Optionally, the restoration event may also include an automatic restoration event, such as the dealing of a quantity of game indicia or the conducting of a quantity of game hands. In a further optional embodiment, the restoration event includes a manual restoration event and an automatic restoration event, whichever occurs first. Upon a restoration event, excluded game indicia are restored to the finite set. In an optional embodiment in which the finite set is ordered, a restoration event also causes a reordering of the finite set.

In an optional embodiment, the player is restricted from placing a greater wager and/or altering the denomination of the wager in the additional sequential game hands. That is, in such an optional embodiment, the player may only change the wager size and/or denomination immediately following a restoration event.

In an optional embodiment directed to multi-denomination wagering, a plurality of wager denominations are defined. The game hand history is separately tracked for play at each wager denomination.

DESCRIPTION

Figure 1:
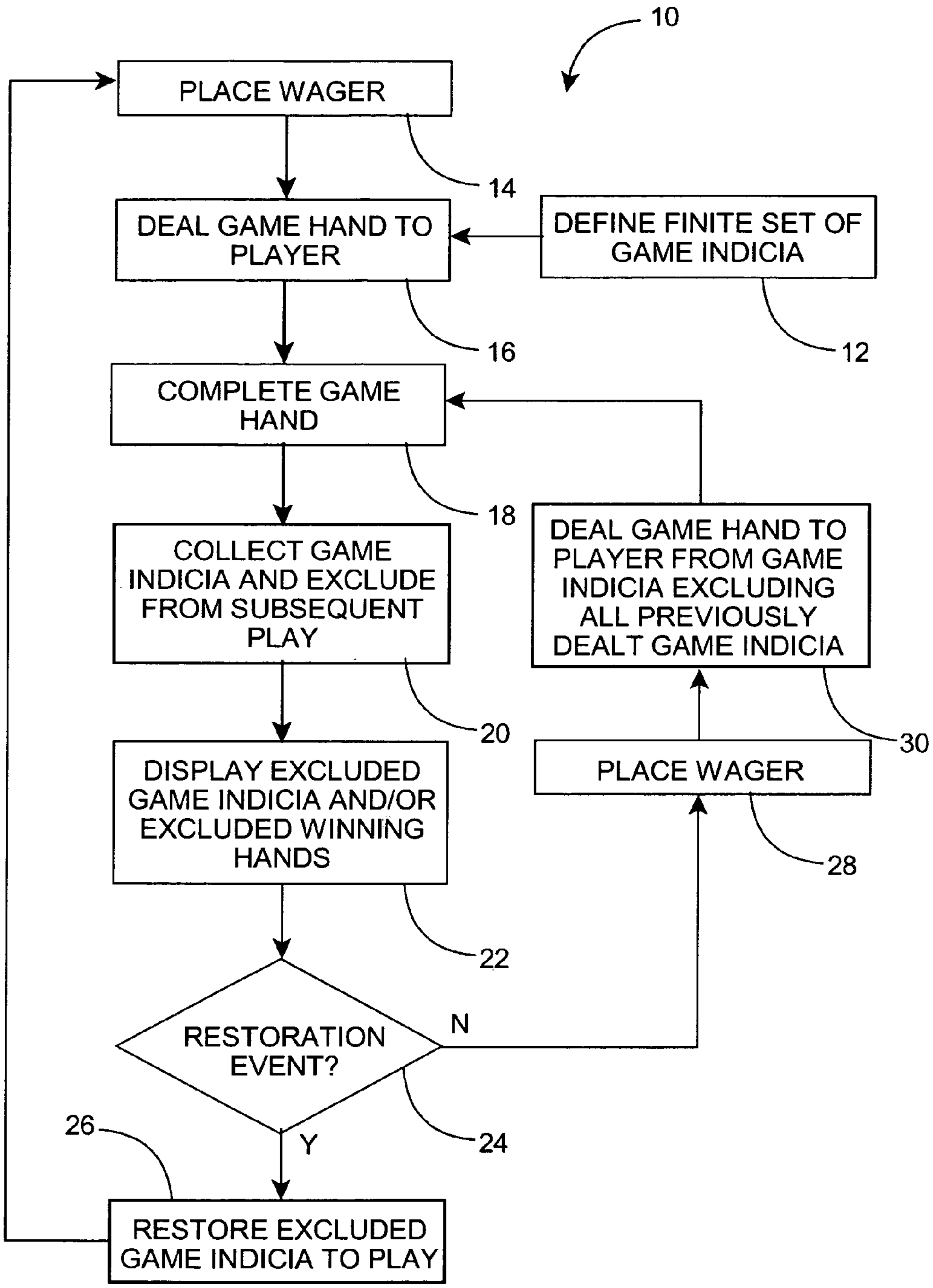
FIG. 1 is a flow chart of a method according to an embodiment of the present invention directed to multiple sequential game hands.
Figure 2:
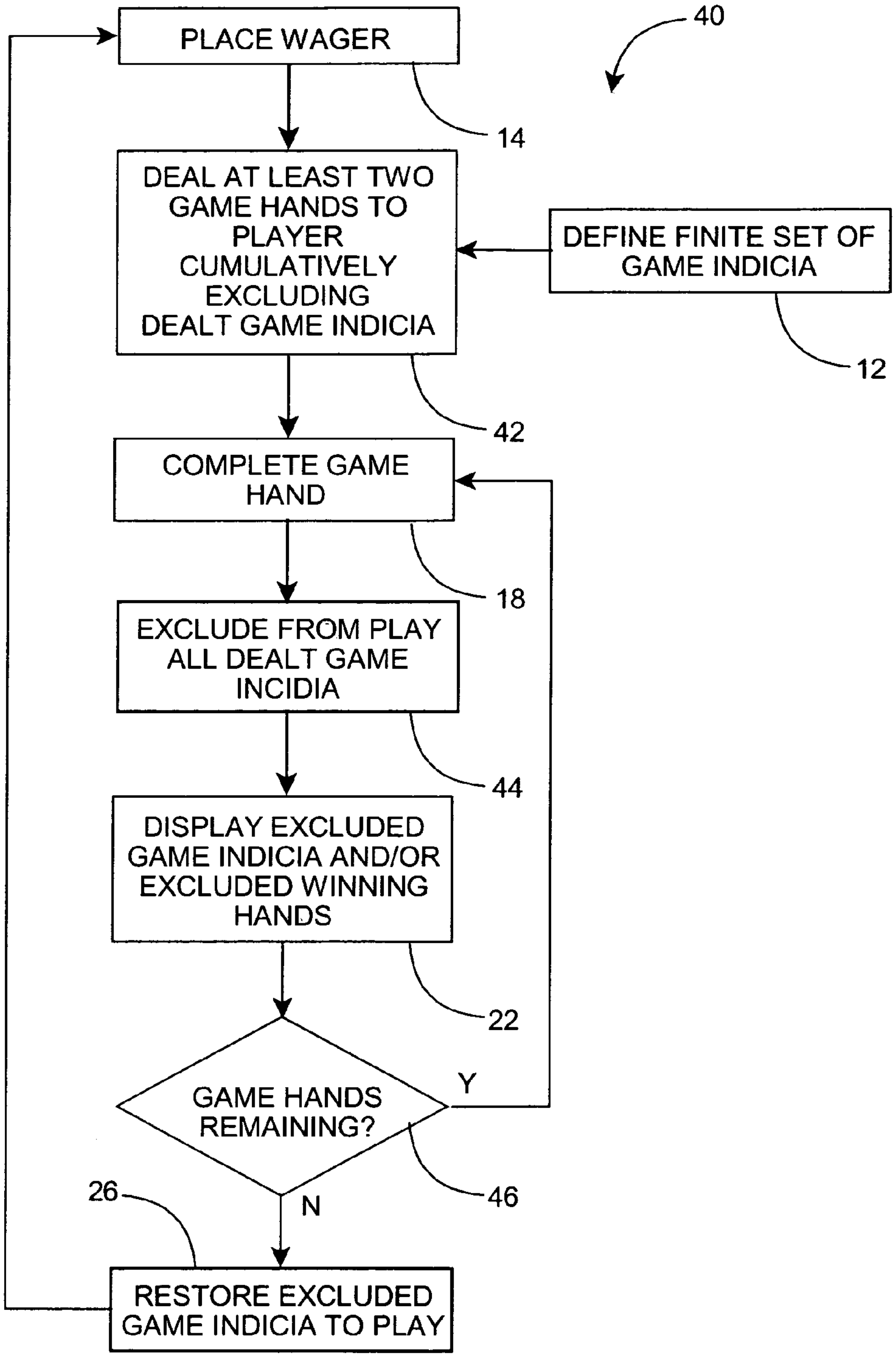
FIG. 2 is a flow chart of a method according to an embodiment of the present invention directed to multiple simultaneous game hands.

Reference is now made to the figures wherein like parts are referred to by like numerals throughout. As shown in FIGS. 1 and 2, the present invention is a method 10 for conducting a wagering game. The present method could be implemented in a gaming machine, live game, PDA, handheld gaming device, cellular telephone, conducted via computer network or Internet, or implemented in any other form.

The present method is directed for use in combination with a base game. The base game may be a pre-existing base game or may be based on a pre-existing base game. Alternatively, the base game may be different from existing games. Among other purposes, the base game rules serve to guide the steps for completing a game hand and determining whether a game hand is a winning hand.

In this regard, it is noted that the present method could be used in conjunction with any base game. For example, the base game may include rules for the completion of a game hand in which a player plays the game indicia dealt, such as in a slot game, lotto, Bingo, stud poker game, or the like. Similarly, the base game may include rules for the completion of a game hand in which a player receives additional game indicia, either automatically or at the player's option, such as in Blackjack or twenty-one, Baccarat, or the like. Additionally, the base game may include rules for the completion of a game hand in which a player may discard and replace game indicia, such as in draw poker or the like. Examples of such games are given below. It is noted that these examples merely illustrate how the present method could be applied to various base games and should not be considered restrictive, since the present method could be adapted to any other base game.

The base game rules may also vary according to the rules determining whether a game hand is a winning hand. The present method could be applied to any base game without regard to how a winning hand is determined. For example, the base game rules may include determining a winning hand by comparing the game hand to a standard, such as a pay table. Similarly, the base game rules may include determining a winning hand by comparing the game hand to a dealer's hand, or one or more player's hand.

The base game may include single player or multi-player games. While the present method could be conducted the same whether a single player or multiple players are playing, in an optional embodiment directed to multi-player games, an optional rule could be implemented in which only one player is eligible to cause a manual restoration event during any game hand. As discussed in greater detail below, the eligibility may rotate among the players in such an optional embodiment.

The present method 10 could be implemented for multiple sequential game hands, such as shown in the optional embodiment of FIG. 1, or for multiple simultaneous game hands, such as the method 40 shown in the optional embodiment of FIG. 2. Turning first to FIG. 1, the present invention includes defining 12 a finite set of game indicia. The game indicia may take any form including, but not limited to, playing cards, numbers, Bingo numbers, slot reel symbols, slot reel stops, or any other indicia. The finite set may include any quantity of game indicia, may include repeated game indicia, and may include multiple "sets" of game indicia, such as multiple decks of cards. That is, by "finite" it is intended that the finite set be closed so that exclusion or depletion, as described below, can occur.

Referring generally to FIGS. 1 and 2, the player places 14 a wager. In an embodiment directed to multiple sequential game hands, as shown in FIG. 1, the player places a wager for each game hand. Optionally, the wager may be controlled in that the player's options for altering a wager and/or wager denomination between restoration events may be limited. This is described in greater detail below. In an embodiment directed to multiple simultaneous game hands, as shown in FIG. 2, the present method may require only a single wager for participation or may require a separate wager for each game hand. Optionally, for certain base games such as Ban-Nag described in greater detail below, the player is required to establish an escrow of a fixed multiple of the wager placed.

Returning to FIG. 1, a game hand is dealt 16 to the player. By "dealt" it is meant that game indicia are assigned to a player. In this regard, it is intended that slot reel symbols, Bingo numbers, lotto numbers, Keno numbers, playing cards, or any other game indicia may be "dealt." In the initial game hand, i.e. a game hand dealt 16 immediately after a restoration event, the game indicia are dealt from the complete finite set. In subsequent game hands, discussed in greater detail below, the game indicia are dealt 30 from the finite set excluding previously dealt game indicia. That is, after a game indicia is dealt it is excluded from subsequent play until a restoration event. For example, in an embodiment in which the finite set is a single deck of playing cards, a dealt game hand of K♡ 2 ◇ A◇ A♧ 7♤ would mean that these cards are depleted from the finite set and, thus, there are no King of hearts, two of diamonds, Ace of diamonds, Ace of clubs, or seven of spades available in the single deck inventory from which subsequent game hands will be dealt until a restoration event.

With continued reference to FIG. 1, the player plays 18 the game hand to completion according to the rules of the base game. As discussed above, the precise base game can vary and, in fact, it is contemplated that the present invention could be applied to any base game. Once the game hand is completed, the game hand is assessed to determine whether the game hand is a winning hand and whether the player is entitled to an award.

The game indicia of the game hand are collected 20, i.e. retired from play. That is, the player does not carry any of the game indicia to the next game hand. In this sense, each game hand is separate because each game hand is separately dealt. Additionally, all previously dealt game indicia are excluded from further from play in a subsequent hand until a restoration event. This "exclusion" of game indicia dealt allows the depletion of game indicia, optionally down to zero, from the universe of game indicia that can be dealt in a subsequent game hand. That is, with dealt game indicia excluded from subsequent play, the total inventory of game indicia is reduced and the inventory of the specific game indicia dealt is reduced, and may reach a zero balance, thereby reducing or eliminating the possibility that a game indicium will be dealt in a subsequent play. This, in turn, could eliminate certain winning outcomes from being dealt. For example, in a game of Ban-Nag using one deck of playing cards, if all four Aces have been dealt in prior game hands, then a Ban-Ban, i.e. two Aces, and a Ban-Nag, i.e. an Ace and a ten-value card, have been eliminated from subsequent hands by the depletion to zero inventory of the Aces, unless a restoration event occurs.

The results of the exclusion of dealt game indicia may optionally be made available to the player by displaying 22 the constitution of the finite set excluding the dealt game indicia (or conversely by displaying the excluded game indicia), by displaying 22 the winning hands eliminated as a result of the exclusion of dealt game indicia (or conversely by displaying only the winning hands that can still be dealt), or a combination thereof.

Additional game hands are conducted with the player placing 28 a wager (and, in certain games such as Ban-Nag, funding the required escrow), receiving a game hand of game indicia, and playing the game hand to completion. As noted above, these additional game hands are dealt 30 from the finite set excluding any previously dealt game indicia. As each additional game hand is completed, the dealt game indicia from the additional game hands are retired from play, e.g. collected from the player and the dealer, if any, and excluded from the inventory of game indicia available for subsequent game hands. As above, the results of the exclusion are displayed to the player.

It is noted that in an optional embodiment, the size of the wager in the additional game hands may be controlled. For example, the player may be restricted in the amount by which the player can increase the wager. That is, in an optional embodiment, the bet spread, i.e. the spread between the minimum wager and the maximum wager, may be different in the additional game hands than in a hand played with the full finite set of game indicia. In a further optional embodiment, players may not be permitted to increase the wager at all during the additional game hands. Rather, the player of such an optional embodiment would only be permitted to increase the player's wager in a game following a restoration event. In other words, in such an embodiment, a player may increase the player's wager (or permitted bet spread) only when the finite set is restored of all the excluded game indicia.

In this regard, it is also contemplated that the present method may be adapted to a game in which multiple wager denominations are established. In an optional embodiment of such a multi-denomination game, the player may be restricted in changing denominations in that the player of such an optional embodiment would only be permitted to change the player's wager denomination in a game following a restoration event. That is, as above, in such an optional embodiment a player may change wager denomination only when the full finite set of game indicia is available. One purpose of such optional wager and wager denomination restrictions is to control the house edge as additional game indicia are excluded from play.

For example, in one optional embodiment, a player is enabled to place a wager of anywhere from one hundred to five hundred credits without allowing players too great an ability to reduce the house edge. This is accomplished in this optional embodiment by dividing the wagers into wager denomination levels in which the maximum wager in any one wager denomination level is a predetermined multiple of the minimum wager. The multiple could depend upon the specific game; for example, in a Blackjack-type game, the multiple could be two, in other games, the multiple could be five. Thus, a first wager denomination level is one credit to five credits, a second wager denomination level is five credits to twenty-five credits, a third wager denomination level is ten credits to fifty credits, a fourth wager denomination level is twenty-five credits to one hundred twenty-five credits, and a fifth wager denomination level is one hundred credits to five hundred credits. Thus, a player is permitted to wager anywhere from one to five hundred credits, or at discrete plateaus therein, but may need to change wager denomination to do so.

According to the present invention, the inventory must be restored or reshuffled to a full contingency before a player can increase the wager denomination. For instance, if a player is playing five credits per hand then wishes to raise the wager to one hundred credits per hand, the player cannot do so at the current wager level which would, at most, permit a wager of twenty-five credits per hand (1×-5×). Thus, the player in such an example would need to change wager denomination to place a wager of one hundred credits per hand. As noted, a change in wager denomination would, in this optional embodiment, be allowed if the player triggers a manual restoration event, i.e. restores the game indicia to the full finite set.

Returning to the optional embodiment of FIG. 1, the additional game hands are dealt until a restoration event 24. The restoration event 24 may include a manual restoration event, an automatic restoration event, or a combination thereof. In one optional embodiment, both a manual restoration event and an automatic restoration event are provided, and the restoration occurs based on whichever occurs first. For example, a manual restoration event may include the player triggering a restoration. Similarly, the automatic restoration event may include the dealing of a predetermined quantity of game indicia and/or the conducting of a predetermined quantity of game hands. Thus, in an embodiment in which both manual and automatic restoration events are permitted, the player may trigger a restoration or may wait until a restoration automatically occurs after a certain quantity of game indicia are dealt and/or a certain quantity of game hands are conducted.

In an optional embodiment, an automatic restoration event may be calculated and fixed from game to game. Thus, in one such optional embodiment, after each restoration event and reconstitution of the game indicia set (as described in greater detail below), an automatic restoration event is determined for the reconstituted game indicia set at a fixed point. The fixed point for the automatic restoration point may be determined in any number of ways, and may be based on any number of factors. For example, in one optional embodiment, the fixed point may be determined to be the point at which a desired house edge is obtained. In one example where a fixed automatic restoration event is used, the trigger for a restoration may is the same occurrence in each series of game hands. In another example where a manual restoration event is combined with a fixed automatic restoration event, the trigger for a restoration may be the earlier of a manual restoration or the fixed automatic restoration event.

In an optional embodiment directed for use in a multi-player game, each player may be able to manually trigger a restoration. However, in another optional embodiment for multi-player games, only one player is eligible to manually trigger a restoration on any game hand. In a further optional embodiment, the eligibility to manually trigger a restoration rotates among the players.

Upon a restoration event, the excluded game indicia are restored 26 to the full set of game indicia available for play. In other words, the full finite set of game indicia are available in a game hand dealt immediately after a restoration event. Optionally, in games in which the finite set is ordered, and game hands are dealt from the ordered finite set, a restoration event may optionally restore excluded game indicia and reorder the finite set.

According to an optional embodiment of the present method, it may be desirable to track game hands to maintain a history of the game indicia available, i.e. the state of depletion, and the game hands dealt. In a multi-denomination embodiment of the present invention, the game history may be separately tracked and stored for each wager denomination plus the total games history of a machine.

The optional embodiment of FIG. 2 is one possible version of the present method 40 applied to a game in which multiple, i.e. at least two, simultaneous game hands are dealt. That is, in the embodiment of FIG. 2, rather than dealing game hands sequentially from a continuously depleted set of game indicia, the game hands are dealt simultaneously from a continuously depleted set of game indicia.

As above, a finite set of game indicia is defined 12. In such an optional embodiment, the player places 14 a wager and multiple game hands are simultaneously dealt 42 to a player. In this optional embodiment, the multiple game hands are dealt 42 from the finite set of game indicia. The game hands are played 18 to completion. Optionally, the player may choose the order in which the game hands are completed. Alternatively, the player may follow a predefined order in playing the game hands. As the player completes each game hand, the game indicia of the dealt hands along with any additional game indicia dealt to a game hand are excluded 44 from the game indicia available in completing another game hand. That is, throughout the conduct of the method, the available game indicia are depleted by the game indicia dealt. At least the game indicia inventory or the winning hands excluded by the depletion are displayed 22 to the player. The process is repeated until there are no game hands remaining 46. After all the game hands are completed, the excluded game indicia are restored 26 for the next subsequent deal.

Below are set forth examples of the present invention as applied to a number of underlying base games. This description should be understood as exemplary only and should not be interpreted as limiting the present method to any particular application.

Ban-Nag

For example, the present method may be applied to Ban-Nag or similar Blackjack-type games. In an optional single player embodiment, one or more game hands are played against a dealer's hand with the object being to obtain a player game hand, the total of which is nearer to twenty-one than the dealer's game hand total is, without exceeding twenty-one. As known in the art, in the present optional embodiment, the Aces count as either one, ten, or eleven (depending on the other cards in the hand), face cards (kings, queens and jacks) as ten, and the numbered cards as their face value. Optionally, the value of an Ace in a hand may be determined according to the following table:

| Number of cards in the hand | Value of an Ace |
|---|---|
| 2 | 10 or 11 |
| 3 | 1 or 10 |
| 4 | 1 |

Each player places a base wager and, in an optional embodiment, an escrow. Optionally, the escrow is mandatory and is a fixed quantity, such as twice the base wager amount. An initial player hand of two cards is dealt face up to the player and an initial dealer hand of two cards is dealt face down to the dealer. The initial dealer hand is displayed after the player completes the final player hand. However, if the initial dealer hand is a Blackjack, i.e. an Ace and a ten-value card or two Aces, then optionally both cards of the dealer are displayed and the game hand is over. Conversely, if a player's first two cards are a Blackjack, the player is typically paid greater than even money assuming the dealer does not also have a Blackjack. In an optional embodiment, the award for a Blackjack could vary, and could depend upon the type of Blackjack obtained, according to a hand resolution table such as the following:

| Player Hand | Dealer Hand | Outcome |
|---|---|---|
| Ace-Ace (Ban-Ban) | Ace-Ace (Ban-Ban) | Push |
| | Total of Fifteen | Optional escape |
| | All Other Hands | Player paid 3:1 |
| Ace-Ten Value (Ban-Nag) | Ace-Ace (Ban-Ban) | Dealer collects 3:1 |
| | Ace-Ten Value (Ban-Nag) | Push |
| | Total of Fifteen | Optional escape |
| | All Other Hands | Dealer collects 2:1 |

If the dealer has a Blackjack in the initial dealer hand, i.e. a hand consisting of either two aces, or an ace and a ten-value card, the dealer is rewarded and the hand is terminated for all players. Optionally, the reward varies with the type of Blackjack obtained according to a pay table, such as the following.

| Dealer Hand | Player Hand | Outcome |
|---|---|---|
| Two Aces (Ban-Ban) | Two Aces (Ban-Ban) | Push |
| | Total of Fifteen | Escape |
| | All Others | Dealer collects 3:1 |
| Ace/Ten-Value (Ban-Nag) | Two Aces (Ban-Ban) | Player paid 3:1 |
| | Ace/Ten-Value (Ban-Nag) | Push |
| | Total of Fifteen | Escape |
| | All Others | Dealer collects 2:1 |

If neither the player nor the dealer has a Blackjack hand, the player completes a final player hand. Optionally, the player's options in forming the final hand may depend on the hand total and the number of cards in the player hand. For example, in an optional embodiment, the following player options may be permitted:

| Player Hand | Player Options |
|---|---|
| 15 or less on four cards or less | Hit |
| 16 to 20 on four cards or less | Hit or stand |
| 16 to 20 on five cards | Player stands and is paid 2:1 if the player hand beats the dealer hand |
| More than 21 | Bust, player loses |
| 21 on four cards | Player stands and is paid 2:1 if the player hand beats the dealer hand |
| 21 on five cards | Player stands and is paid 3:1 if the player hand beats the dealer hand |
| 20 or less on six or more cards | Player stands and is paid 3:1 if the player hand beats the dealer hand |

In an optional embodiment, a "free hand" may be designated. For example, in an optional embodiment, a free hand may be a hand totaling fifteen. In such an optional embodiment, if, at any point in the play of a hand, a player achieves a hand totaling fifteen, the player has the option to escape, and push his wager, regardless of the dealer hand. Alternatively, the player has the option to continue play, foregoing the escape option.

Optionally, the escape option may be available to the dealer if the dealer obtains a free hand. For example, in an optional embodiment, if the dealer receives a hand totaling fifteen, the dealer has the option to escape, declaring a non-hand, pushing all wagers. Alternatively, the dealer has the option to continue playing the hand, foregoing the escape option. Optionally, the dealer escape election may be limited in some fashion. For example, in one such optional embodiment, the dealer's exercise of the escape option is determined by deck factors, such as the number of cards depleted, the number of hands dealt, or the like.

In an optional embodiment, a proposition wager may be offered. For example, in one optional embodiment, a player with a player game hand having an eligible sum may elect to place a proposition wager referred to as a "Perfect Hit" wager. In one optional embodiment, an eligible sum is a hand sum ranging between twelve through sixteen. A player electing to place the proposition wager is rewarded if the player obtains a player game hand with a specified target sum. In an optional embodiment, the target sum is twenty-one, although in alternate optional embodiments, different or additional target sums could be specified. In an optional embodiment, the proposition wager may be available for election by the player at any time after the initial player hand is dealt. In a further optional embodiment, the proposition wager may be elected more than once during a game hand if the player still retains a player game hand with an eligible player game hand sum, e.g. between twelve and sixteen in the example above. In an optional embodiment, a player winning the proposition wager may be rewarded at different rates depending upon the number of additional cards the player receives before reaching the target value. For example, in an optional embodiment, if a player places a proposition wager and receives only one additional card to reach the target value, the player may be rewarded at a first rate, such as 9 to 1, whereas a player needing more than one additional card to reach the target value may be rewarded at a second rate less than the first rate. Optionally, the proposition wager is resolved in game hands where the dealer has Blackjack if the bet was placed before dealer shows a Blackjack hand.

If the dealer has a hand totaling less than twenty-one, the dealer completes the final dealer hand. In an optional embodiment, the dealer options in forming the final dealer hand are parallel to the player options in forming the final player hand as described above. In a further optional embodiment, the dealer options may be supplemented by house ways rules to prescribe the circumstances in which the dealer hits or stands on dealer hands totaling between 16 and 20.

If the dealer busts, all remaining final player hands, i.e. final player hands that have not busted, are paid at 1:1. If the dealer stands, the remaining final player hands are compared to the final dealer hand. If the total of the dealer final hand is higher than that of a player final hand, the player loses his base wager. If the total of a player final hand is higher than that of the dealer final hand, the player wins and is paid at 1:1. If the total of a player final hand equals that of the dealer final hand, that player pushes, i.e. neither wins nor loses. Optionally, as the potential for a player losing more than his wager exists where the dealer has a Ban-Ban, a Ban-Nag, or a hand containing five cards. In this circumstance, the player loses his base wager and a portion or all of his escrow.

Thus, in one optional embodiment, the possible outcomes may be summarized as shown in the following example table:

| Player Hand | Dealer Hand | Outcome |
|---|---|---|
| Total of 15 | All Hands | Optional player escape |
| Over 21 | All Hands | Dealer collects 1:1 |
| Equal to 21 (four cards) | Ace-Ace (Ban-Ban) | Dealer collects 3:1 |
| | Ace-Ten Value (Ban-Nag) | Dealer collects 2:1 |
| | All Other Hands | Player paid 2:1 |
| Equal to 21 (five cards) | All Hands | Player paid 3:1 |
| Less than 21 (five cards) | All Hands | Player paid 2:1 |
| Less than 21 (six or more cards) | All Hands | Player paid 3:1 |
| All Other Hands | Ace-Ace (Ban-Ban) | Dealer collects 3:1 |
| | Ace-Ten Value (Ban-Nag) | Dealer collects 2:1 |
| | Total of Fifteen | Optional dealer escape |
| | Over twenty-one | Player paid 1:1 |
| | All Other Hands | Closest to 21 paid 1:1 |

In this optional embodiment, one or more fifty-two card standard poker decks are used. In an optional embodiment, as many as eight decks or more may be used. According to the present invention, multiple hands are played from the deck and dealt cards are retired from further play until a restoration event.

More specifically, as each game indicium, i.e. playing card, is dealt to either a player hand or a dealer hand, it is displayed to the player and removed from the deck inventory. That is, each card in a conventional poker deck is a separate symbol and as each symbol is played there is a balance of zero for that symbol in the deck inventory. When a symbol or combination of symbols that can form a winning combination for a listed payout is not available as a consequence of the exclusion of dealt cards, a display notifies the player. As applied to Ban-Nag, this information may be used by a player determining whether to elect an Escape option on a hand total of fifteen. Optionally, the player may manually restore or reshuffle the deck inventory if the player chooses to do so.

As noted above, a restoration event could be a manual restoration triggered by a player, an automatic restoration, or a combination thereof. For example, in one optional embodiment, the player may have the ability to manually trigger an early reshuffle of the deck inventory after any completed hand by utilizing the “Reshuffle” button function of the game. Additionally or alternatively, a game may be conducted using a finite set of one or two decks of cards and an automatic restoration point may be set at a point where 75% of the cards have been depleted. In an alternate optional embodiment, a game may be conducted using a finite set of one deck and an automatic restoration point may be set at a point where twenty-nine cards or less remain in the finite set or when there are one or zero Aces remaining in the finite set. The present game may also be directed for use in a multi-player format. In such an embodiment, any player may be able to manually trigger a restoration or, in an optional embodiment, the ability to manually trigger a restoration may rotate among players.

As above, limits on the bet spread (i.e. the difference between the minimum and maximum wager) and the ability of the player to change wager denomination may apply. That is, in an optional embodiment, the player may be restricted from changing wager denomination except after excluded indicia are restored either manually or automatically.

In an optional embodiment, each player may play multiple game hands dealt simultaneously. That is, in such an optional embodiment, two or more hands are dealt to the player and one hand to the dealer.

While the player may be required to complete the player's game hands in a particular sequence, in an optional embodiment, the player may select the order in which the hands are played. Thus, one strategy would be to use the display of the excluded cards, or alternatively the cards not excluded, the player may play the game hands in the order that optimizes the player's chance of obtaining a particular card. As above, a Blackjack is an automatic win for the player unless the dealer also has a blackjack hand. All hands lose if dealer has a Blackjack, except that if the player has one or more Blackjacks a push outcome may occur.

As above, cards are dealt from the continuously depleted deck until an automatic restoration event or manual restoration event, whichever occurs first. In this optional embodiment, an automatic restoration occurs when a quantity of cards have been dealt. Additionally, the player may also manually trigger a restoration after the dealer hand is completed.

It is specifically noted that the present invention is not limited to video gaming machine and computer, e.g. Internet, play. Rather, the present invention may be applied to table games as well. According to an optional embodiment, a table version of the present invention may include an object placed in front of only one player on any game hand to represent a “Reshuffle” button. This “Reshuffle” button would allow only one player to manually trigger a restoration before an automatic restoration. Optionally, the “Reshuffle” button rotates each time the deck is restored, either manually or automatically.

It is further noted that the quantity of cards played before an automatic restoration can be significant. By utilizing a consistent automatic restoration point, there is less risk that the house advantage will be too low or that the player will gain an advantage. For example, in a game using six-decks of playing cards, the automatic restoration point set at seventy-eight cards remaining gives an average casino hold of 2.42% over the long term. However, by setting the automatic restoration point at seventy-nine cards remaining, the average casino hold raises to 2.53% over the long term.

Thus, by controlling the automatic restoration point, along with the minimum and maximum wager spread and any limitations on changing wager denomination, a Ban-Nag or similar game can be created applying the present method that does not allow the player to have an advantage over the house.

Blackjack-Type Games

The present method may also be applied to Blackjack or Blackjack-type games. In an optional single player embodiment, one or more hands are played against a dealer's hand with the object being to obtain a player hand, the total of which is nearer to twenty-one than the dealer's hand total is, without exceeding twenty-one. As known in the art, in the present optional embodiment, the Aces count as either one or eleven, face cards (kings, queens and jacks) as ten, and the numbered cards as their face value.

Two cards are dealt face up to the player and two cards are dealt to the dealer, one face up and one face down, commonly known as the hole card. The dealer's hole card is displayed after the player completes the player's game hand. However, if the dealer's hand is a natural twenty-one, i.e. an ace and a ten-value card also known as Blackjack, in a version of the game that does not have the insurance option, then both cards of the dealer are displayed and the game hand is over. Conversely, if a player's first two cards are a natural twenty-one, or Blackjack, the player is typically paid greater than even money assuming the dealer does not also have a Blackjack. The precise award for a Blackjack could vary.

If, after completing the game hand by hitting or standing, the total value of the player's game hand is closer to twenty-one than the dealer's hand, then the player will win and be paid, optionally at even money. Additional options, such as splitting and doubling down may also be made available to the player. If a player's cards total more than twenty-one, the player busts and the player loses the wager bet. If the player and dealer have the same hand totals of seventeen or more a push occurs and bets are returned.

As above, in an optional embodiment, a proposition wager may be offered. For example, in one optional embodiment, a player with a player game hand having an eligible sum may elect to place a proposition wager referred to as a "Perfect Hit" wager. In one optional embodiment, an eligible sum is a hand sum ranging between a hard or soft twelve through sixteen. As is understood in this game, a "hard" hand sum occurs when a hand lacks any Aces, or Aces in the hand are counted as one; a "soft" hand sum occurs when a hand includes Aces counted as eleven. A player electing to place the proposition wager is rewarded if the player obtains a player game hand with a specified target sum. In an optional embodiment, the target sum is twenty-one, although in alternate optional embodiments, different or additional target sums could be specified. Optionally, the player may be rewarded for any player game hand reaching the hand sum in two or more cards including before or after split hands. In an optional embodiment, the proposition wager may be available for election by the player at any time after the initial player hand is dealt. In a further optional embodiment, the proposition wager may be elected more than once during a game hand if the player still retains a player game hand with an eligible player game hand sum, e.g. between twelve and sixteen in the example above, unless the player has doubled down on a hand. Optionally, a player may be permitted to place the proposition wager only prior to doubling down. In an optional embodiment, a player winning the proposition wager may be rewarded at different rates depending upon the number of additional cards the player receives before reaching the target value. For example, in an optional embodiment, if a player places a proposition wager and receives only one additional card to reach the target value, the player may be rewarded at a first rate, such as 9 to 1, whereas a player needing more than one additional card to reach the target value may be rewarded at a second rate less than the first rate. Optionally, the proposition wager is resolved in game hands where the dealer has Blackjack if the bet was placed before dealer shows a Blackjack hand.

Such a proposition wager may be offered on any game with any size finite set. As may be appreciated, the present method may aid the player in calculating the optimum time to place the bonus bet by utilizing the card depletion and the display of cards depleted, cards remaining, or outcomes depleted. Optionally, the proposition wager is separately recorded and separately accounted for.

In this optional embodiment, one or more fifty-two card standard poker decks are used. In an optional embodiment, as many as eight decks or more may be used. According to the present invention, multiple hands are played from the deck and dealt cards are excluded from further play until a restoration event.

More specifically, as each game indicia, i.e. playing card, is dealt to either a player hand or a dealer hand, it is displayed to the player and removed from the deck inventory. That is, each card in a conventional poker deck is a separate symbol and as each symbol is played there is a balance of zero for that symbol in the deck inventory. When a symbol or combination of symbols that can form a winning combination for a listed payout is not available as a consequence of the exclusion of dealt cards, a display notifies the player. Optionally, the player may manually restore or reshuffle the deck inventory if the player chooses to do so. For example, if, as a result of the depletion, the Blackjack combination is eliminated, a display is provided to the player.

As suggested, the player has the ability to manually trigger an early reshuffle of the deck inventory after any completed hand by utilizing the "Reshuffle" button function of the game. The present game may also be directed for use in a multi-player format. In such an embodiment, any player may be able to manually trigger a restoration or, in an optional embodiment, the ability to manually trigger a restoration may rotate among players.

As above, limits on the bet spread (i.e. the difference between the minimum and maximum wager) and the ability of the player to change wager denomination may apply. That is, in an optional embodiment, the player may be restricted from changing wager denomination except after excluded indicia are restored either manually or automatically.

In an optional embodiment, each player may play multiple game hands dealt simultaneously. That is, in such an optional embodiment, two or more hands are dealt to the player and one hand to the dealer.

While the player may be required to complete the player's game hands in a particular sequence, in an optional embodiment, the player may select the order in which the hands are played. Thus, one strategy would be to use the display of the excluded cards, or alternatively the cards not excluded, the player may play the game hands in the order that optimizes the player's chance of obtaining a particular card. As above, a Blackjack is an automatic win for the player unless the dealer also has a blackjack hand. All hands lose if dealer has a Blackjack, except that if the player has one or more Blackjacks a push outcome may occur.

As above, cards are dealt from the continuously depleted deck until an automatic restoration event or manual restoration event, whichever occurs first. In this optional embodiment, an automatic restoration occurs when a quantity of cards have been dealt. Additionally, the player may also manually trigger a restoration after the dealer hand is completed.

In a further optional embodiment, a bonus may be provided for occurrences over multiple game hands. For example, in one optional embodiment, three game hands are dealt to the player and one hand to the dealer. In this optional embodiment, the player receives a bonus payout for multiple Blackjacks, such as three Blackjacks for the three simultaneously dealt player game hands. In another optional embodiment, a player may be dealt four game hands and a bonus may be provide for multiple Blackjacks, such as two, three, or four Blackjacks, in the four simultaneously dealt player game hands.

It is specifically noted that the present invention is not limited to video gaming machine and computer, e.g. Internet, play. Rather, the present invention may be applied to table games as well. According to an optional embodiment, a table version of the present invention may include an object placed in front of only one player on any game hand to represent a "Reshuffle" button. This "Reshuffle" button would allow only one player to manually trigger a restoration before an automatic restoration. Optionally, the "Reshuffle" button rotates each time the deck is restored, either manually or automatically.

It is further noted that the quantity of cards played before an automatic restoration can be significant. By utilizing a consistent automatic restoration point, a payout of any blackjack type game will have less risk that the house advantage will be too low or that the player will gain an advantage. For example, in a game using six-decks of playing cards, the automatic restoration point set at seventy-eight cards remaining gives an average casino hold of 2.42% over the long term. However, by setting the automatic restoration point at seventy-nine cards remaining, the average casino hold raises to 2.53% over the long term.

Thus, by controlling the automatic restoration point, along with the minimum and maximum wager spread and any limitations on changing wager denomination, a Blackjack-type game can be created applying the present method that does not allow the player to have an advantage over the house. Thus, in an optional embodiment, the present invention includes the calculation of an automatic restoration point to minimize the risk that the player will gain an advantage, or that the house will lose an advantage, over the long term including such factors as the size of the finite set. The present invention further includes using such a calculated automatic restoration point consistently such as by automatically restoring the game indicia in an electronic version, or by marking a shoe of playing cards to include a guide, e.g. a channel, groove or visual marker, to position mark a consistent automatic restoration position when the decks are restored.

While certain embodiments of the present invention have been shown and described it is to be understood that the present invention is subject to many modifications and changes without departing from the spirit and scope of the claims presented herein.

We claim:

1. A method for conducting a card game between at least one player and a dealer, comprising:

defining a finite set of playing cards;

conducting a game hand for said player comprising:

(a) receiving a wager from said player;

(b) dealing an initial player hand of two cards to said player from said finite set cumulatively excluding all cards dealt in previous game hands, if any, and dealing an initial dealer hand of two cards to said dealer from said finite set cumulatively excluding all cards dealt in previous game hands, if any;

(c) completing a player game hand by dealing one or more additional cards to said initial player hand, standing on the initial player hand;

(d) completing a dealer game hand by dealing one or more additional cards to said initial dealer hand, or standing on the initial dealer hand; and (e) determining an outcome of said game hands and resolving said wager; and (f) excluding all cards dealt to the player game hand and dealer game hand, accumulated with all cards dealt in previous game hands, if any, from play in a subsequent game hand;

notifying the player of the exclusion of cards from play as a result of being dealt in previous game hands, if any, by providing the player with information about the finite set remaining until a restoration event;

conducting additional sequential game hands of steps (a)-(f) until said restoration event; and upon said restoration event, restoring excluded game indicia to said finite set.

2. The method of claim 1 wherein said restoration event comprises a manual restoration event triggered by said player.

3. The method of claim 1 wherein said restoration event includes an automatic restoration event comprising at least one of: conducting a predetermined quantity of game hands or dealing a predetermined quantity of said cards.

4. The method of claim 1 wherein said restoration event includes a manual restoration event or an automatic restoration event, whichever occurs first, said automatic restoration event comprising at least one of: conducting a predetermined quantity of game hands or dealing a predetermined quantity of said game indicia.

5. The method of claim 1 further comprising:

defining as plurality of wager denominations; and separately tracking the game hand history for play at each wager denomination.

6. The method of claim 1 further comprising:

defining a plurality of wager denominations; and wherein said player is restricted from placing a wager of different denomination in said additional sequential game hands.

7. The method of claim 1 wherein said player is restricted from placing a greater wager in said additional sequential game hands.

8. The method of claim 1 wherein said step of playing said game band to completion includes dealing additional game indicia to said game hand.

9. The method of claim 1 wherein said method is conducted for a plurality of players and said restoration event includes a manual restoration event triggered by a player wherein only one player is eligible to trigger a manual restoration event on any game hand.

10. The method of claim 1 wherein each playing of as game hand further comprises displaying at least one of: the inventory of said cards from said finite set cumulatively excluding all cards dealt in previous game hands or winning outcomes eliminated as as result of said excluded cards.

11. The method of claim 1 further comprising:

if, during completing a player game hand, the sum of the values of the cards in the player game hand is a predefined eligible player game hand sum, receiving from said player an election whether to place a proposition wager; and for each player placing a proposition wager, rewarding said player based on said proposition wager if the sum of the values of the cards in the completed player game hand equal a target value.

12. The method of claim 11 further comprising:

for each player placing a proposition wager, rewarding said player at a first rate if the sum of the values of the cards in the player game hand equal said target value after dealing only one additional card to said player game hand after said proposition wager is placed; and for each player placing a proposition wager, rewarding said player at a second rate if the sum of the values of the cards in the player game hand equal said target value after dealing more than one additional card to said player game hand after said proposition wager is placed, wherein said first rate is greater than said second rate.

13. A method for conducting a card game between at least one player and a dealer, comprising:

defining a finite set of playing cards;

conducting a game hand comprising:

(a) receiving a wager from said player;

(b) dealing an initial player hand of two cards to said player from said finite set cumulatively excluding all cards dealt in previous game hands, if any, and dealing an initial dealer hand of two cards to said dealer from said finite set cumulatively excluding all cards dealt in previous game hands, if any;

(c) completing a player game hand by dealing one or more additional cards to said initial player hand, standing on the initial player hand, or, upon obtaining a predetermined sum of playing cards, opting to escape;

(d) completing a dealer game hand by dealing one or more additional cards to said initial dealer hand, standing on the initial dealer hand, or, upon obtaining a predetermined sum of cards, opting to escape; and (e) determining an outcome of said game hands and resolving said wager; and (f) excluding all cards dealt to the player game hand and dealer game hand, accumulated with all cards dealt in previous game hands, if any, from play in a subsequent game hand;

notifying the player of the exclusion of cards from play as a result of being dealt in previous game hands, if any, by providing the player with a visual display of the finite set remaining until a restoration event;

additional sequential game hands of steps (a)-(f) cumulatively excluding cards from said finite set until said restoration event; and upon said restoration event, restoring excluded cards to said finite set.

14. The method of claim 13, wherein play of each game hand further comprises:

if, during completing as player game hand, the sum of the values of the cards in the player game hand is a predefined eligible player game hand sum, receiving from said player an election whether to place a proposition wager; and for each player placing a proposition wager, rewarding said player based on said proposition wager if the sum of the values of the cards in the completed player game hand equal a target value.

15. The method of claim 14 further comprising:

for each player placing a proposition wager, rewarding said player at a first rate if the sum of the values of the cards in the player game hand equal said target value after dealing only one additional card to said player game hand after said proposition wager is placed; and for each player placing a proposition wager, rewarding said player at a second rate if the sum of the values of the cards in the player game hand equal said target value after dealing more than one additional card to said player game hand after said proposition wager is placed, wherein said first rate is greater than said second rate.

16. The method of claim 13 wherein said restoration event includes a manual restoration event triggered by said player.

17. The method of claim 16 wherein said method is conducted simultaneously for a plurality of players wherein only one player is eligible to trigger a manual restoration event on any game hand.

18. The method of claim 13 wherein said restoration event includes a manual restoration event triggered by said player or an automatic restoration event, whichever occurs first, said automatic restoration event comprising at least one of: conducting a predetermined quantity of game hands or dealing a predetermined quantity of said cards.

19. The method of claim 13 wherein said restoration event includes an automatic restoration event comprising at least one of: conducting a predetermined quantity of game hands or dealing a predetermined quantity of said cards.

20. The method of claim 13 further comprising:

defining a plurality of wager denominations; and separately tracking the game history for play at each wager denomination.

21. The method of claim 13 further comprising:

defining a plurality of wager denominations; and wherein said player is restricted from placing a wager of different denomination in said additional sequential games.

22. The method of claim 13 wherein said player is restricted from placing a greater wager in said additional sequential games.

23. The method of claim 13 wherein each playing of a game hand further comprises displaying at least one: of the inventory of said cards from said finite set cumulatively excluding all cards dealt in previous game hands or winning outcomes eliminated as a result of said excluded cards.

24. The method of claim 13 further comprising:

receiving an escrow from a player simultaneous with receiving said wager; and resolving, said escrow based on said game hands.

25. The method of claim 24 wherein cards two through ten have a value equal to their face value, cards ten, Jack, Queen, and King have a value equal to ten, and Aces have a value of one in a hand containing four or more cards, a value of one or ten in a hand containing three cards, a value of eleven in a hand of two cards, wherein said step of completing a player game hand further comprises:

defining an initial player hand containing two Aces or an Ace and a ten-value card as an automatic outcome for said player;

for a game hand totaling sixteen or fourteen or less, said player receiving at least one additional card;

for a game hand totaling fifteen, said player opting to escape resulting in a push outcome for said player, or opting to receive additional cards;

for a game hand totaling between sixteen and twenty-one, said player opting to stand, or opting to hit and receive at least one additional card;

for a game hand totaling more than twenty-one, said player busting resulting in a losing outcome for said player;

for a game hand containing five cards and totaling twenty-one or less, said player standing resulting in a winning outcome for said player;

said step of completing a dealer game hard further comprising:

for a game hand totaling sixteen or fourteen or less, said dealer receiving at least one additional card;

for a game hand totaling fifteen, said dealer opting to escape resulting in a push outcome for all players, or opting to receive additional cards;

for a game hand totaling between sixteen and twenty-one, said dealer standing and receiving no additional playing cards;

for a game hand totaling more than twenty-one, said dealer busting resulting in a player winning outcome;

for a game hand containing five cards and totaling twenty-one or less, said dealer standing resulting in a player losing outcome; and for game hands not otherwise a player winning outcome, a player losing outcome, or a push, resolving said game hands by comparing said dealer game hand to said player game hand and, if said player game hand is closer to twenty-one than said dealer game hand is, the outcome is a player winning outcome.

26. The method of claim 25 wherein said step of resolving said wager and escrow comprises:

rewarding a final player hand of five cards totaling less than twenty-one at 2:1;

rewarding a final player hand of five cards totaling twenty-one at 3:1;

rewarding a final player hand of four cards totaling twenty-one at 2:1 when the final dealer hand does not total twenty-one;

rewarding a final player hand of six cards totaling less than twenty-one at 3:1;

for a final dealer hand of five cards totaling less than twenty-one, collecting said wager and a portion of said escrow;

for a final dealer hand of five cards totaling twenty-one, collecting said wager and all of said escrow;

for a final dealer hand of our cards totaling twenty-one, collecting said wager and a portion of said escrow; and for a final dealer hand of six cards totaling twenty-one or less, collecting said wager and all of said escrow.

27. A method for conducting a card game between at least one player and a dealer, comprising:

defining a finite set of playing cards;

conducting a game comprising:

(a) receiving a wager from said player;

(b) dealing an initial player hand of two cards to said player from said finite set cumulatively excluding all cards dealt in previous game hands, if any, and dealing an initial dealer hand of two cards to said dealer from said finite set cumulatively excluding all cards dealt in previous game hands, if any;

(c) forming a final player hand by dealing one or more additional cards to said initial player hand, standing on the initial player hand;

(d) forming a final dealer hand by dealing one or more additional cards to said initial dealer hand, standing on the initial dealer hand; and (e) determining an outcome of said game and resolving said wager;

(f) excluding all cards dealt to the player and dealer in the game accumulated with all cards dealt in previous games, if any, from play in a subsequent game; and (g) displaying at least one of: the inventory of said cards from said finite set cumulatively excluding all cards dealt in previous game hands or winning outcomes eliminated as a result of said excluded cards;

conducting additional sequential games of steps (a)-(g) cumulatively excluding cards from said finite set until a restoration event, said restoration event including at least an automatic restoration event consisting of dealing a predetermined quantity of said cards calculated to be the point at which a desired house edge is obtained; and upon a restoration event, restoring excluded cards to said finite set.

28. The method of claim 27 fluffier comprising:

if, during completing a player game hand, the sum of the values of the cards in the player game hand is a predefined eligible player game hand sum, receiving from said player an election whether to place a proposition wager;

for each player placing a proposition wager, rewarding said player based on said proposition wager if the sum of the values of the cards in the completed player game hand equal a target value;

for each player placing a proposition wager, rewarding said player at a first rate if the sum of the values of the cards in the player game hand equal said target value after dealing only one additional card to said player game hand after said proposition wager is placed; and for each player placing a proposition wager, rewarding said player at a second rate if the sum of the values of the cards in the player game hand equal said target value after dealing more than one additional card to said player game hand after said proposition wager is placed, wherein said first rate is greater than said second rate.

29. The method of claim 27 wherein cards two through ten have a value equal to their face value, cards ten, Jack, Queen, and King have as value equal to ten, and Aces have a value of one in a hand containing four or more cards, a value of one or ten in a hand containing three cards, a value of eleven in as hand of two cards, wherein said step of completing, as player game hand further comprises:

defining an initial player hand containing two Aces or an Ace and a ten-value card as an automatic outcome for said player;

for a game hand totaling sixteen or fourteen or less, said player receiving at least one additional card;

for a game hand totaling fifteen, said player opting to escape resulting in a push outcome for said player, or opting to receive additional cards;

for a game hand totaling between sixteen and twenty-one, said player opting to stand, or opting to hit and receive at least one additional card;

for a game hand totaling more than twenty-one, said player busting resulting in a losing outcome for said player;

for a game hand containing five cards and totaling twenty-one or less, said player standing resulting in a winning outcome for said player;

said step of completing a dealer game hand further comprising:

for a game hand totaling sixteen or fourteen or less said dealer receiving at least one additional card;

a game hand totaling fifteen, said dealer opting to escape resulting in a push outcome for all players, or opting to receive additional cards;

for a game hand totaling between sixteen and twenty-one, said dealer standing and receiving no additional playing cards;

for a game hand totaling more than twenty-one, said dealer busting resulting in a player winning outcome;

for a game hand containing five cards and totaling twenty-one or less, said dealer standing resulting in a player losing outcome; and for game hands not otherwise a player winning outcome, a player losing outcome, or a push, resolving said game hands by comparing said dealer game hand to said player game hand and, if said player game hand is closer to twenty-one than said dealer game hand is, the outcome is a player winning outcome.

30. The method of claim 29 further comprising receiving an escrow from a player and wherein said step of resolving said wager and escrow comprises:

rewarding a final player band of five, cards totaling less than twenty-one at 2:1;

rewarding a final player hand of five cards totaling twenty-one at 3:1;

rewarding a final player hand of four cards totaling twenty-one at 2:1 when the final dealer hand does not total twenty-one;

rewarding a final player hand of six cards totaling, less than twenty-one at 3:1;

for a final dealer hand of five cards totaling, less than twenty-one, collecting said wager and as portion of said escrow;

for a final dealer hand of five cards totaling twenty-one, collecting said wager and all of said escrow;

for a final dealer hand of four cards totaling twenty-one, collecting said wager and a portion of said escrow; and for a final dealer hand of six cards totaling twenty-one or less, collecting said wager and all of said escrow.

31. The method of claim 27 wherein said method is conducted for a plurality of players and further comprises a manual restoration event wherein only one player is eligible to trigger a manual restoration event on any game band.

32. The method of claim 31 wherein said restoration event includes a manual restoration event triggered by said player or an automatic restoration event, whichever occurs first, said automatic restoration event comprising at least one of: conducting a predetermined quantity of game hands or dealing a predetermined quantity of said cards.

33. The method of claim 27 further comprising:

defining a plurality of wager denominations; and separately tracking the game history for play at each wager denomination.

34. The method of claim 27 further comprising:

defining a plurality of wager denominations; and wherein said player is restricted from placing a wager of different denomination in said additional sequential game hands.

35. The method of claim 27 wherein said player is restricted from placing a greater base wager in said additional sequential game hands.

* * * * *